United States Patent
Sueishi

(10) Patent No.: US 11,648,803 B2
(45) Date of Patent: May 16, 2023

(54) MOTORCYCLE TIRE FOR RUNNING ON ROUGH TERRAIN

(71) Applicant: Sumitomo Rubber Industries, Ltd., Hyogo (JP)

(72) Inventor: Makoto Sueishi, Kobe (JP)

(73) Assignee: Sumitomo Rubber Industries, Ltd., Hyogo (JP)

(*) Notice: Subject to any disclaimer, the term of this patent is extended or adjusted under 35 U.S.C. 154(b) by 85 days.

(21) Appl. No.: 17/230,073

(22) Filed: Apr. 14, 2021

(65) Prior Publication Data

US 2021/0347211 A1 Nov. 11, 2021

(30) Foreign Application Priority Data

May 11, 2020 (JP) .............................. JP2020-083127

(51) Int. Cl.
*B60C 11/11* (2006.01)
*B60C 11/03* (2006.01)
*B60C 11/13* (2006.01)

(52) U.S. Cl.
CPC ............. *B60C 11/11* (2013.01); *B60C 11/033* (2013.01); *B60C 11/1369* (2013.01); *B60C 2200/10* (2013.01); *B60C 2200/14* (2013.01)

(58) Field of Classification Search
CPC ... B60C 11/11; B60C 11/033; B60C 11/1369; B60C 2200/10; B60C 2200/14; B60C 2011/0351; B60C 2011/0355; B60C 2011/1338
See application file for complete search history.

(56) References Cited

U.S. PATENT DOCUMENTS

| | | | |
|---|---|---|---|
| 4,470,443 A | 9/1984 | Eraud | |
| D581,348 S * | 11/2008 | Sueishi | ........................ D12/536 |
| 2003/0024621 A1 | 2/2003 | Neugebauer et al. | |
| 2012/0024443 A1 | 2/2012 | Ishida | |
| 2018/0264888 A1 * | 9/2018 | Hinami | ............... B60C 11/0302 |

FOREIGN PATENT DOCUMENTS

| | | | | |
|---|---|---|---|---|
| EP | 1892127 A1 * | 2/2008 | ......... | B60C 11/0309 |
| EP | 2 529 954 A1 | 12/2012 | | |
| JP | 2012030658 A | 2/2012 | | |
| JP | 2020-32849 A | 3/2020 | | |

* cited by examiner

*Primary Examiner* — Robert C Dye
*Assistant Examiner* — Wendy L Boss
(74) *Attorney, Agent, or Firm* — Studebaker & Brackett PC

(57) ABSTRACT

A tire has a block pattern. The block pattern includes a plurality of linked block pairs. Each linked block pair includes two blocks 28 and a tie bar 30 interposed between the two blocks 28 and linking the two blocks 28 together. The tie bar 30 has a toe end 40 having a height equal to or smaller than a height of the blocks 28 and a heel end 38 having a height smaller than the height of the toe end 40.

9 Claims, 6 Drawing Sheets

MOTORCYCLE TIRE FOR RUNNING ON ROUGH TERRAIN

This application claims priority on and the benefit of Patent Application No. 2020-083127 filed in JAPAN on May 11, 2020. The entire disclosures of this Japanese Patent Application are hereby incorporated by reference.

BACKGROUND OF THE INVENTION

Field of the Invention

The present invention relates to a tire for a motorcycle which runs on rough terrain. In particular, the present invention relates to improvement of a tread of the tire.

Description of the Related Art

A motorcycle tire for running on rough terrain includes a tread having a block pattern. The block pattern includes a sea and a large number of blocks. Each block rises from the sea. In running on a soft ground surface, the blocks stick in the ground surface. The tire exhibits excellent traction performance on the soft ground surface by virtue of the edge effect of the blocks.

In running on a hard ground surface, the blocks are less likely to stick in the ground surface. A dominant factor related to contribution to the traction performance on the hard ground surface is the stiffness of the blocks. A tread with high stiffness is desired.

A tire is known in which two adjacent blocks are connected by a tie bar. The height of the tie bar is smaller than the height of the blocks. The tie bar can contribute to the stiffness of the tread. An example of the tire having the tie bar is disclosed in Japanese Laid-Open Patent Application Publication No. 2012-030658 (Japanese Patent No. 5174095).

As stated above, the height of the tie bar is smaller than the height of the blocks. However, the tie bar is higher than the sea. Thus, the tie bar can hinder the blocks from sticking in a soft ground surface. In a situation where the load imposed on the tire is low, the force pressing the tire against the ground surface is weak. Especially in this situation, the tie bar hinders the sticking of the blocks. The tie bar can be a cause of decrease in grip force of the tire.

An object of the present invention is to provide a motorcycle tire for running on rough terrain, the motorcycle tire including a tie bar which can contribute to the stiffness and at the same time being excellent in grip force under low load conditions.

SUMMARY OF THE INVENTION

A motorcycle tire for running on rough terrain according to the present invention includes a tread having a block pattern. The block pattern includes: a sea; a plurality of blocks, each block rising from the sea and having a land; and a plurality of tie bars, each tie bar rising from the sea. A plurality of block pairs are formed in the block pattern, each block pair including two adjacent ones of the plurality of blocks. The block pairs include a plurality of linked block pairs. Each linked block pair includes two of the plurality of blocks and one of the plurality of tie bars, the tie bar of the linked block pair being interposed between the two blocks and linking the two blocks together. The tie bar of the linked block pair has a toe end having a height equal to or smaller than a height of the blocks and a heel end having a height smaller than the height of the toe end.

The motorcycle tire for running on rough terrain according to the present invention is excellent in grip force under low load conditions despite including the tie bars.

Preferably, the tie bar has a height that continuously increases from the heel end toward the toe end.

Preferably, a line connecting the heel end and the toe end forms an angle of 2° or more with a circumferential direction of the tire.

Preferably, a ratio H2/Hb in the linked block pair is 0.20 or more and 0.95 or less, wherein H2 represents the height of the toe end and Hb represents the height of the blocks.

The tread includes: a crown zone located in a center of the tread in an axial direction of the tire; a pair of middle zones, each middle zone being located outward of the crown zone in the axial direction; and a pair of shoulder zones, each shoulder zone being located outward of the middle zone in the axial direction. Preferably, a ratio N1/N in the crown zone is 0.10 or more, wherein N1 represents the number of the linked block pairs in which the height of the toe end is greater than the height of the heel end and N represents the number of all the block pairs.

Preferably, a land ratio in the block pattern is 13% or more and 60% or less.

Preferably, a JIS-A hardness of the linked block pair is 45 or more and 88 or less.

The tire may be mounted on a front rim of a motorcycle.

DESCRIPTION OF THE PREFERRED EMBODIMENTS

The following will describe in detail the present invention based on preferred embodiments with appropriate reference to the drawings.

Figure 1:
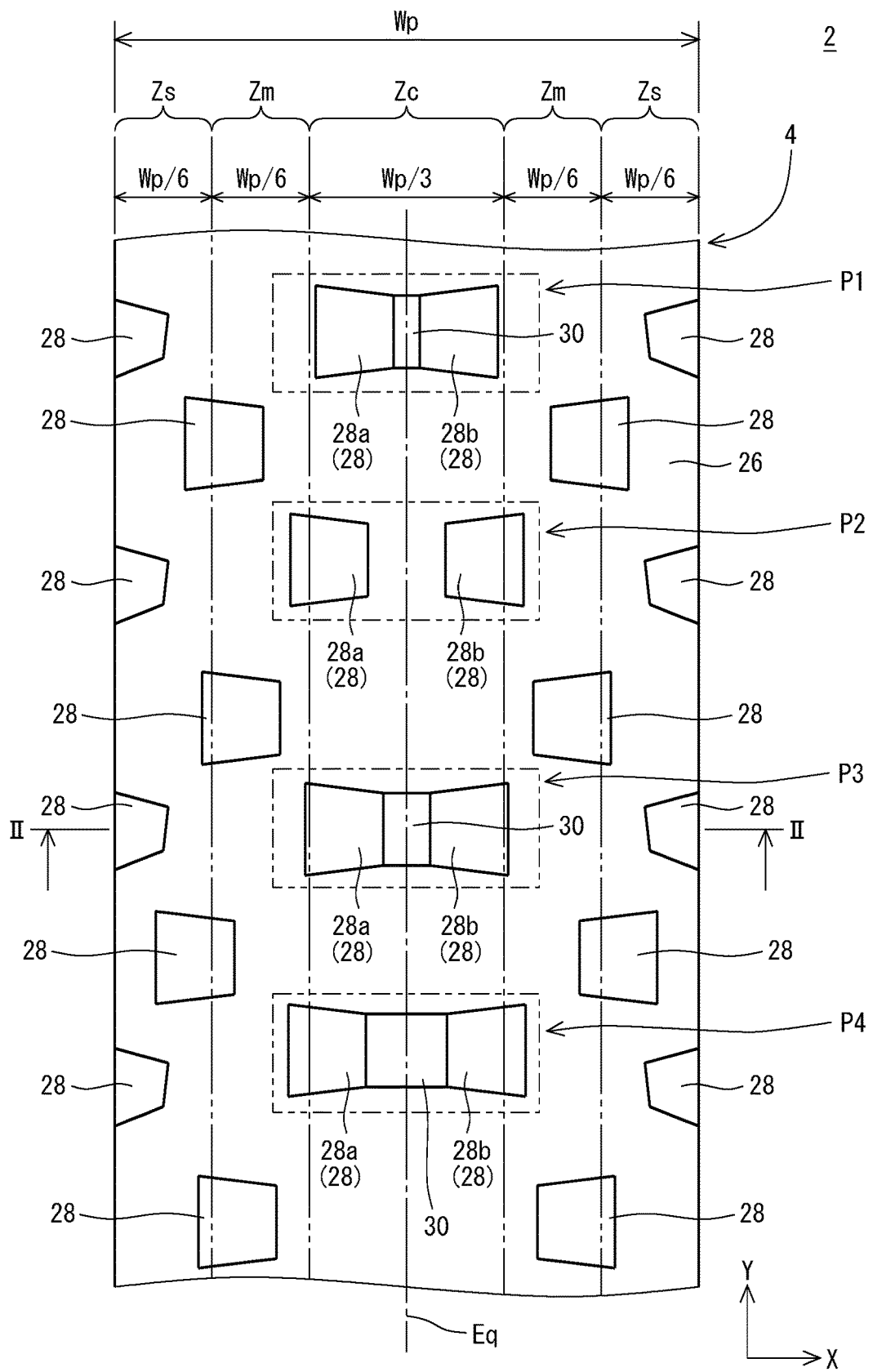
FIG. 1 is a developed view showing a part of a motorcycle tire for running on rough terrain according to an embodiment of the present invention.
Figure 2:
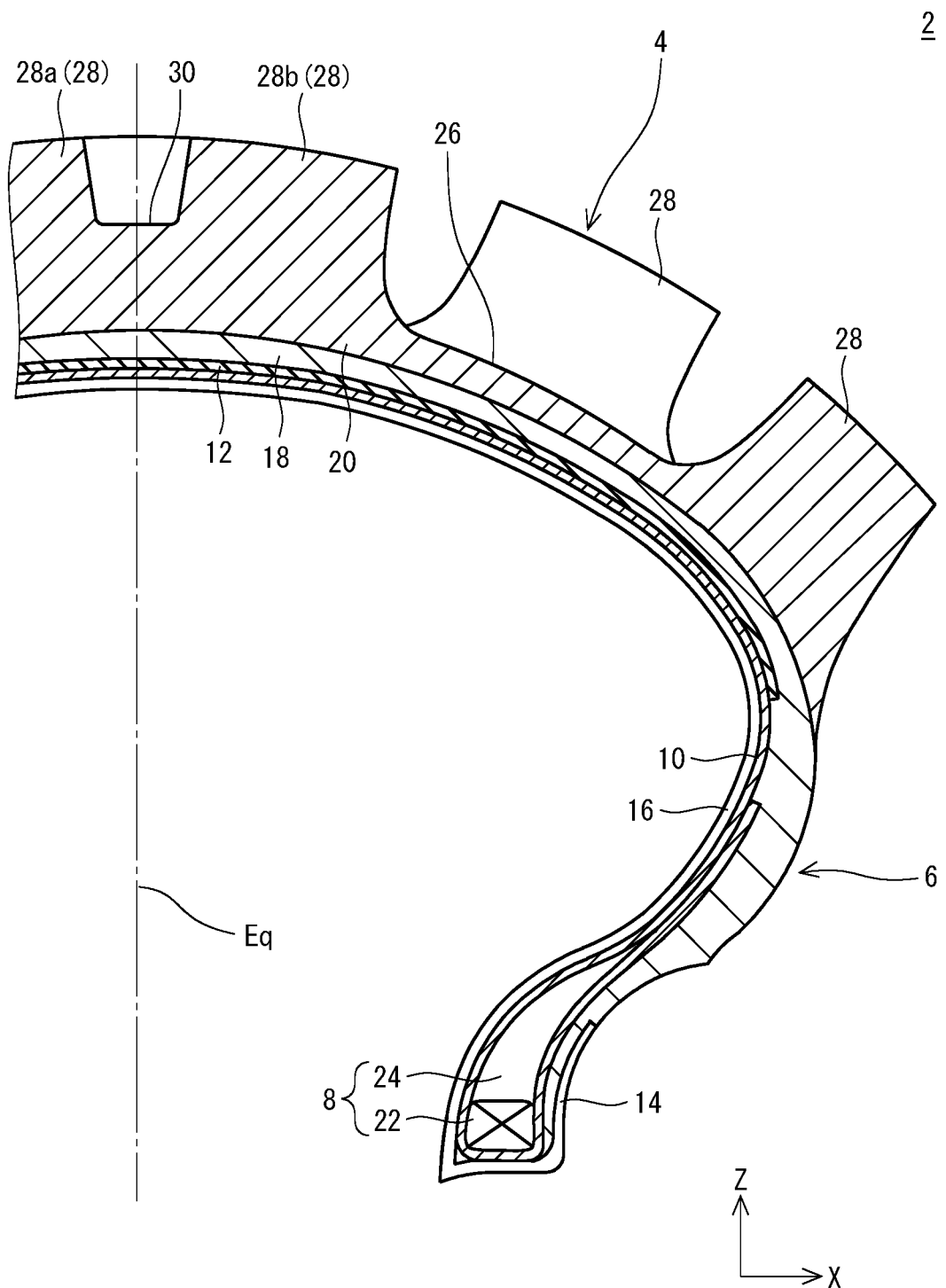
FIG. 2 is an enlarged cross-sectional view taken along the line II-II of FIG. 1.

FIGS. 1 and 2 show a motorcycle tire 2. The tire 2 is adapted for running on rough terrain such as that found in mountains, forests, or wildlands. The tire 2 includes a tread 4, sidewalls 6, beads 8, a carcass 10, a belt 12, chafers 14, and an inner liner 16. In FIGS. 1 and 2, the reference character X represents the axial direction of the tire, the reference character Y represents the circumferential direction of the tire, and the reference character Z represents the radial direction of the tire. It should be noted that the surface (curved surface) of the tire 2 is depicted as a flat surface in the developed view of FIG. 1. In FIG. 2, the dashed-dotted line Eq represents the equator plane of the tire 2. The tire 2 is shaped to be substantially mirror symmetric with respect to the equator plane Eq. In the present embodiment, the tire 2 is mounted on a front rim of a motorcycle. The tire 2 according to the present invention may be mounted on a rear rim of a motorcycle.

The tread 4 is shaped to project outward in the radial direction. The tread 4 is constituted by a base 18 and a cap 20. The base 18 is made of a crosslinked rubber. The cap 20 is located outward of the base 18 in the radial direction. The cap 20 is made of a crosslinked rubber.

Each sidewall 6 extends substantially inward in the radial direction from the edge of the tread 4. The sidewall 6 is made of a crosslinked rubber. The sidewall 6 is elastically deformable to absorb shock applied from the ground surface. Further, the sidewall 6 prevents external damage to the carcass 10. In the present embodiment, the material of the sidewall 6 is the same as the material of the base 18. The sidewall 6 and the base 18 are integrally formed.

Each bead 8 is located substantially inward of the sidewall 6 in the radial direction. The bead 8 includes a core 22 and an apex 24 extending outward in the radial direction from the core 22. The core 22 is ring-shaped. In the core 22, a non-stretchable wire is wound in a plurality of turns. A typical material of the non-stretchable wire is steel. The apex 24 is tapered outward in the radial direction. The apex 24 is made of a high-hardness crosslinked rubber.

The carcass 10 extends on and between the two opposite beads 8 and lies along the inner sides of the tread 4 and sidewalls 6. The carcass 10 is layered on the inner liner 16. The carcass 10 is turned up around each core 22 from inside to outside in the axial direction. The carcass 10 includes a single ply. The carcass 10 may include two or more plies.

Although not illustrated, the carcass 10 includes a large number of cords aligned with one another and a topping rubber. The cords obliquely intersect the equator plane Eq. The cords may be substantially perpendicular to the equator plane Eq. The cords are typically made of organic fibers. Preferred examples of the organic fibers include polyester fibers, nylon fibers, rayon fibers, polyethylene naphthalate fibers, and aramid fibers.

The belt 12 is located outward of the carcass 10 in the radial direction. The belt 12 is layered on the carcass 10. The belt 12 reinforces the carcass 10. The belt 12 includes a single layer. The belt 12 may include two or more layers. Although not illustrated, the belt 12 includes a large number of cords aligned with one another and a topping rubber. The cords are inclined with respect to the equator plane Eq. The absolute value of the angle of inclination is 10° or more and 35° or less. The cords are typically made of organic fibers. The material of the cords may be steel.

FIG. 1 shows a part of a tread pattern. In the tire 2 as a whole, this tread pattern is repeated in the circumferential direction. In the present embodiment, the tread pattern is mirror symmetric with respect to the equator plane Eq. The tread pattern may be asymmetric with respect to the equator plane Eq.

In FIG. 1, the arrow Wp represents the periphery of the tread 4. The tread 4 can be divided into a crown zone Zc, a pair of middle zones Zm, and a pair of shoulder zones Zs. The periphery of the crown zone Zc is ⅓ of the periphery Wp of the tread 4. The periphery of each middle zone Zm is ⅙ of the periphery Wp of the tread 4. The total periphery of the two middle zones Zm is ⅓ of the periphery Wp of the tread 4. The periphery of each shoulder zone Zs is ⅙ of the periphery Wp of the tread 4. The total periphery of the two shoulder zones Zs is ⅓ of the periphery Wp of the tread 4.

The tread pattern includes a sea 26 and a plurality of blocks 28. Each block 28 rises from the sea 26. This tread pattern is referred to as a block pattern. The tread pattern further includes a plurality of tie bars 30. Each tie bar 30 rises from the sea 26.

As is apparent from FIG. 1, the blocks 28 and the tie bars 30 are present in the crown zone Zc. The blocks 28 are present in the middle zones Zm. Any tie bar 30 is not present in the middle zones Zm. The blocks 28 are present in the shoulder zones Zs. Any tie bar 30 is not present in the shoulder zones Zs.

FIG. 1 shows a first block pair P1, a second block pair P2, a third block pair P3, and a fourth block pair P4. The block pairs are present in the crown zone Zc. The block pairs may be present in the middle zones Zm. The block pairs may be present in the shoulder zones Zs. For a block pair lying across the boundary between different zones, the center of area of the contour shape of the block pair is used as a basis for determining to which zone the block pair belongs. The zone in which the center of area is situated is determined as the zone to which the block pair belongs.

Figure 3:
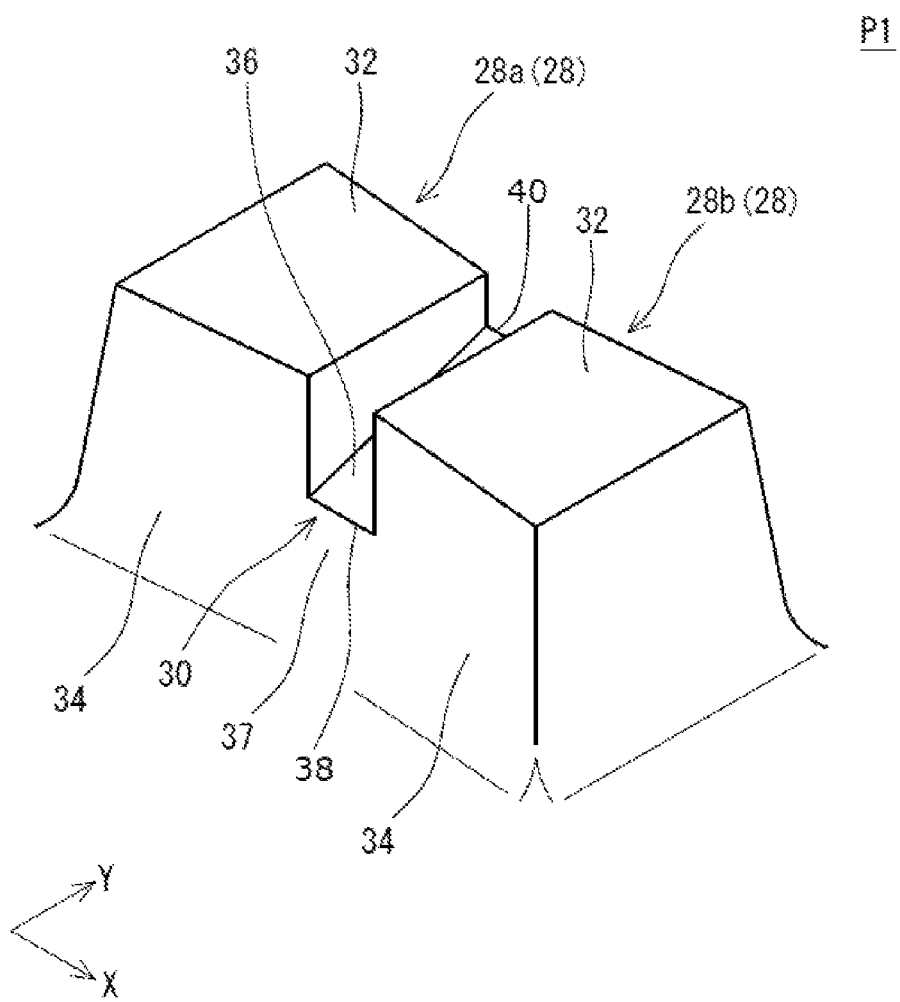
FIG. 3 is a perspective view showing a first block pair of the tire of FIG. 1.
Figure 4:
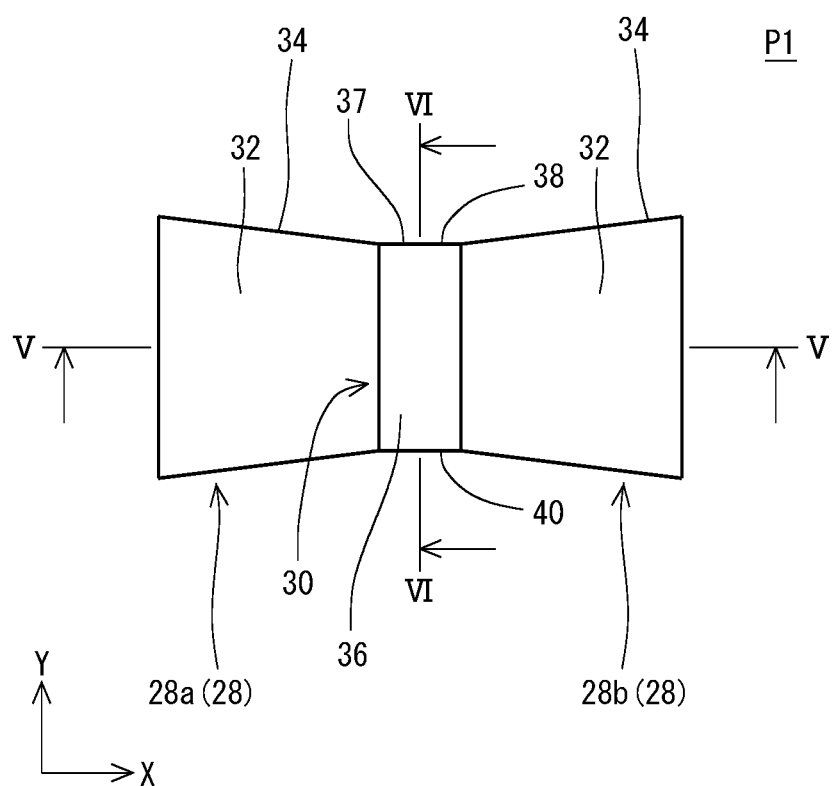
FIG. 4 is a plan view showing the first block pair of FIG. 3.

FIG. 3 is a perspective view showing the first block pair P1, and FIG. 4 is a plan view showing the first block pair P1. The first block pair P1 includes a left block 28a, a right block 28b, and a tie bar 30.

The left block 28a and the right block 28b are adjacent to each other. Any other block 28 is not present between the left and right blocks 28a and 28b. In the present embodiment, as is apparent from FIG. 1, the left and right blocks 28a and 28b are mirror symmetric with respect to the equator plane Eq. Each block 28 includes a land 32 and a side surface 34. The land 32 is flat. The side surface 34 extends from the land 32 toward the sea 26 (see FIG. 1). In FIG. 1, the side surface 34 is omitted.

The tie bar 30 is interposed between the left and right blocks 28a and 28b. The tie bar 30 links the left and right blocks 28a and 28b together. In the present embodiment, the tie bar 30 is situated in the equator plane Eq. The tie bar 30 is recessed relative to a plane defined by the two lands 32. In other words, the height of the tie bar 30 is smaller than the height of the blocks 28.

In the present invention, a block pair including two blocks 28 and a tie bar 30 interposed between the two blocks 28 and linking the two blocks 28 together is referred to as a "linked block pair". The first block pair P1 is a linked block pair. As stated above, the height of the tie bar 30 is smaller than the height of the blocks 28. Thus, in the linked block pair, the land 32 of the left block 28a and the land 32 of the right block 28b are separate from each other.

As stated above, the tie bar 30 links the left and right blocks 28a and 28b together. Thus, excessive deformation of the left block 28a can be prevented by the tie bar 30 and the right block 28b. Further, excessive deformation of the right block 28b can be prevented by the tie bar 30 and the left block 28a. The tie bar 30 can contribute to the stiffness of the linked block pair. In the tire 2 including the linked block pair, the stiffness of the tread 4 is high. When mounted on a drive wheel, the tire 2 can contribute to the traction performance on hard ground surfaces.

As shown in FIG. 1, the second block pair P2 includes a left block 28a and a right block 28b. The left block 28a and the right block 28b are adjacent to each other. In the present embodiment, the left and right blocks 28a and 28b are mirror symmetric with respect to the equator plane Eq. The second block pair P2 does not include any tie bar 30. Thus, the sea 26 lies between the left and right blocks 28a and 28b. The second block pair P2 is not a linked block pair.

As shown in FIG. 1, the third block pair P3 includes a left block 28a, a right block 28b, and a tie bar 30. The left block 28a and the right block 28b are adjacent to each other. In the present embodiment, the left and right blocks 28a and 28b are mirror symmetric with respect to the equator plane Eq. In the present embodiment, the tie bar 30 is situated in the equator plane Eq. The tie bar 30 is interposed between the left and right blocks 28a and 28b. The tie bar 30 of the third block pair P3, like the tie bar 30 of the first block pair P1, links the left and right blocks 28a and 28b together. The third block pair P3 is a linked block pair. The width of the tie bar 30 of the third block pair P3 is larger than the width of the tie bar 30 of the first block pair P1. The properties of the third block pair P3 other than the width of the tie bar 30 are substantially the same as those of the first block pair P1.

As shown in FIG. 1, the fourth block pair P4 includes a left block 28a, a right block 28b, and a tie bar 30. The left block 28a and the right block 28b are adjacent to each other. In the present embodiment, the left and right blocks 28a and 28b are mirror symmetric with respect to the equator plane Eq. In the present embodiment, the tie bar 30 is situated in the equator plane Eq. The tie bar 30 is interposed between the left and right blocks 28a and 28b. The tie bar 30 of the fourth block pair P4, like the tie bar 30 of the first block pair P1, links the left and right blocks 28a and 28b together. The fourth block pair P4 is a linked block pair. The width of the tie bar 30 of the fourth block pair P4 is larger than the width of the tie bar 30 of the first block pair P1. The properties of the fourth block pair P4 other than the width of the tie bar 30 are substantially the same as those of the first block pair P1.

Figure 5:
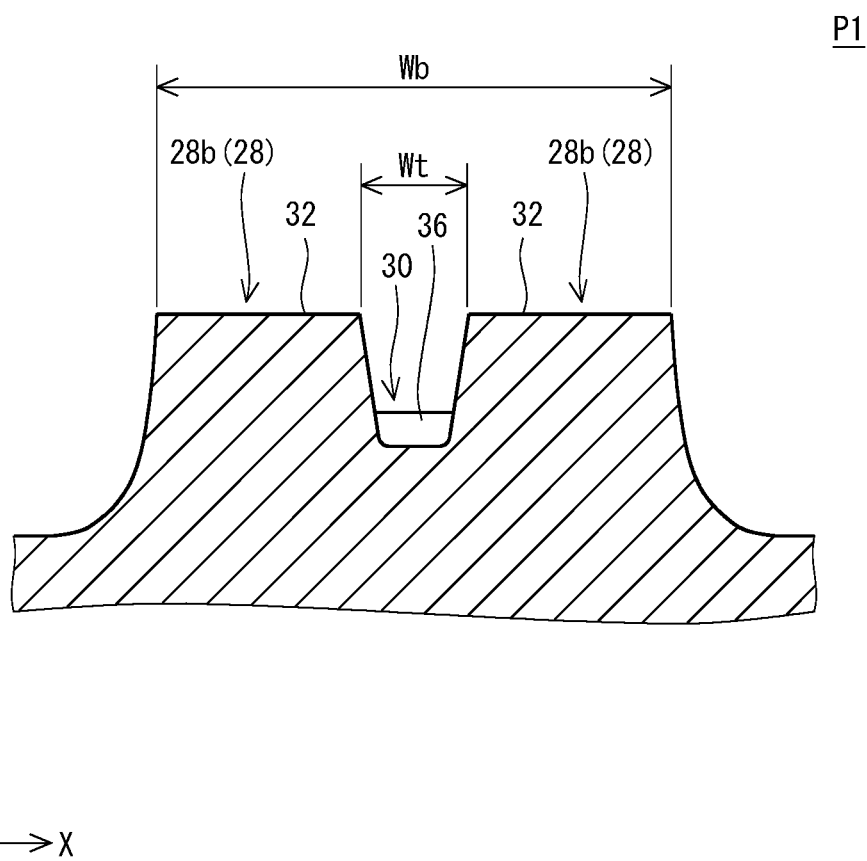
FIG. 5 is a cross-sectional view taken along the line V-V of FIG. 4.
Figure 6:
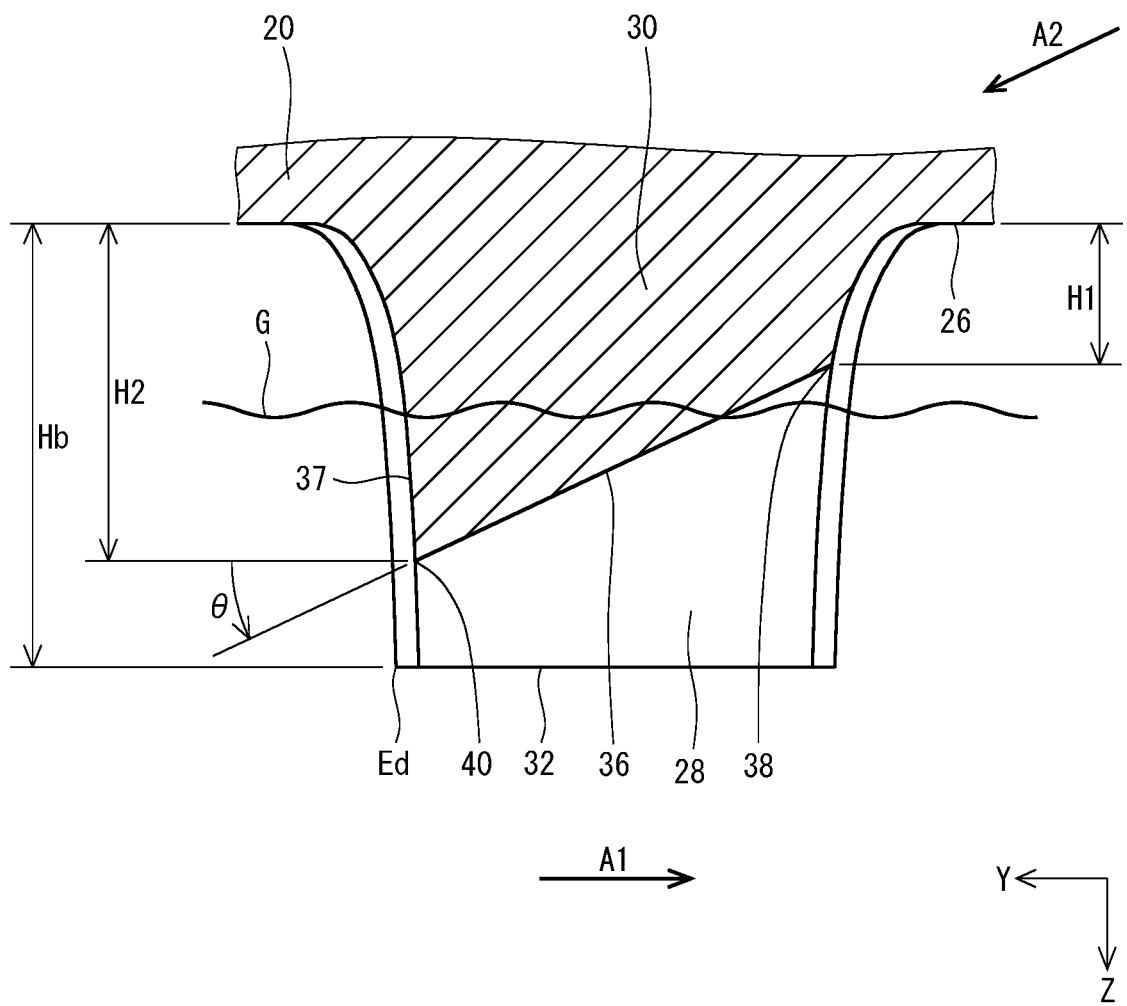
FIG. 6 is a cross-sectional view taken along the line VI-VI of FIG. 4.

FIG. 5 is a cross-sectional view taken along the line V-V of FIG. 4. FIG. 6 is a cross-sectional view taken along the line VI-VI of FIG. 4. FIGS. 5 and 6 show the first block pair P1. The following will describe in detail the present invention based on the first block pair P1. The following description applies also to the linked block pairs other than the first block pair P1.

The tie bar 30 has a top surface 36 and a side surface 37 (see also FIGS. 3 and 4). The top surface 36 is inclined with respect to the circumferential direction (Y direction). The top surface 36 has a heel end 38 and a toe end 40. The side surface 37 is smoothly continuous with the side surfaces 34 of the blocks 28.

In FIG. 6, the arrow Hb represents the height of the blocks 28 from the sea 26, the arrow H1 represents the height of the heel end 38 from the sea 26, and the arrow H2 represents the height of the toe end 40 from the sea 26. The height Hb is the distance between a toe edge Ed of the land 32 and the sea 26. The height H2 of the toe end 40 is equal to or smaller than the height Hb of the blocks 28. The height H1 of the heel end 38 is smaller than the height Hb of the blocks 28 and smaller than the height H2 of the toe end 40.

FIG. 6 further shows a ground surface G. The ground surface G is soft. Thus, a part of each block 28 sticks in the ground surface G. In FIG. 6, the arrow A1 represents the direction of forward rotation of the tire 2. During forward rotation of the tire 2, the vicinity of the heel end 38 first makes contact with the ground. The ground contact portion gradually shifts along the top surface 36. The direction of the shift is the leftward direction in FIG. 6. Finally, the toe end 40 makes contact with the ground.

Upon braking, the motorcycle is decelerated. During deceleration, the load imposed on the tire 2 is low. Further, during deceleration, the peripheral speed of rotation of the tire 2 is lower than the moving speed of the motorcycle. In FIG. 6, the arrow A2 represents the direction of a force acting on the linked block pair during deceleration.

Since the height H1 of the heel end 38 is smaller than the height H2 of the toe end 40, the tie bar 30 pushes aside dirt and sand while the tire 2 is rolling. Thus, even in a situation where a force acts in the direction of the arrow A2, the resistance arising from the tie bar 30 is low. The tie bar 30 sufficiently sticks in the ground surface G. This sticking reduces the slip between the tire 2 and the ground surface G. The tire 2 is excellent in grip performance during deceleration (or under low load conditions).

The tie bar 30 in which the height H1 of the heel end 38 is smaller than the height H2 of the toe end 40 is disadvantageous in terms of grip performance during acceleration. A front tire (driven wheel) need not exhibit a great grip force during acceleration. In view of low resistance, a small grip force is preferred during acceleration. When the tire 2 according to the present invention is mounted on a front rim, high grip performance during deceleration and low resistance during acceleration can be achieved.

During acceleration, a rear tire (drive wheel) is subjected to a significantly high load. Thus, the tie bar 30 sufficiently sticks in the ground surface G despite the height H1 of the heel end 38 being smaller than the height H2 of the toe end 40. The tie bar 30 does not significantly deteriorate the grip performance during acceleration. When the tire 2 according to the present invention is mounted on a rear rim, high grip performance during deceleration and high stiffness (traction) during acceleration and steady-speed running can be achieved by the tie bar 30.

In the present embodiment, as is apparent from FIG. 6, the height of the tie bar 30 continuously increases from the heel end 38 toward the toe end 40. In other words, the top surface 36 is free of steps. The tie bar 30 sufficiently pushes aside dirt and sand. The tie bar 30 may be stepped.

In FIG. 6, the reference character $\theta$ represents the angle that a line connecting the heel end 38 and the toe end 40 forms with the circumferential direction (Y direction). The angle $\theta$ is preferably 2° (degrees) or more. The tie bar 30 with an angle $\theta$ of 2° or more sufficiently pushes aside dirt and sand. In view of this, the angle $\theta$ is more preferably 10° or more and particularly preferably 20° or more. The tie bar 30 with an excessively large angle $\theta$ adversely increases the resistance during deceleration. In view of low resistance, the angle $\theta$ is preferably 55° or less, more preferably 50° or less, and particularly preferably 45° or less. The angle $\theta$ is measured based on the line connecting the heel end 38 and the toe end 40 also when the tie bar 30 is stepped.

The difference between the height H2 of the toe end 40 and the height H1 of the heel end 38 (difference H2−H1) is preferably 0.5 mm or more and 10.0 mm or less. The tie bar 30 with the difference H2−H1 in the above range sufficiently pushes aside dirt and sand. In view of this, the difference H2−H1 is more preferably 1.5 mm or more and particularly preferably 2.0 mm or more. The difference H2−H1 is more preferably 8.0 mm or less and particularly preferably 7.0 mm or less. The height H1 is preferably 0.0 mm or more and 15.0 mm or less. The height H2 is preferably 0.5 mm or more and 20.0 mm or less.

The ratio of the height H2 of the toe end 40 to the height Hb of the blocks 28 (ratio H2/Hb) is preferably 0.20 or more and 0.95 or less. The linked block pair with a ratio H2/Hb of 0.20 or more can have sufficient stiffness. In view of this, the ratio H2/Hb is more preferably 0.35 or more and particularly preferably 0.50 or more. When the linked block pair has a ratio H2/Hb of 0.95 or less, both the left block 28a and the right block 28b sufficiently stick in the ground surface. In view of this, the ratio H2/Hb is more preferably 0.80 or less and particularly preferably 0.70 or less.

In FIG. 5, the reference character Wb represents the width of the linked block pair, and the reference character Wt represents the width of the tie bar 30. The widths Wb and Wt are measured in the axial direction (X direction). In view of the sticking of the left and right blocks 28a and 28b in the ground surface and in view of the stiffness of the linked block pair, the ratio of the width Wt to the width Wb (ratio Wt/Wb) is preferably 0.05 or more and 0.50 or less.

The tread 4 may include a linked block pair in which the height of the toe end 40 is equal to the height of the heel end 38, in addition to the linked block pair in which the height of the toe end 40 is greater than the height of the heel end 38. The tread 4 may include a linked block pair in which the height of the toe end 40 is smaller than the height of the heel end 38. Preferably, the tire 2 satisfies the following expressions.

$$N1/N \geq 0.10$$

$$N=N1+N2+N3+N4$$

N1: The number of linked block pairs which are present in the crown zone Zc and in which the height of the toe end 40 is greater than the height of the heel end 38.

N2: The number of linked block pairs which are present in the crown zone Zc and in which the height of the toe end 40 is equal to the height of the heel end 38.

N3: The number of linked block pairs which are present in the crown zone Zc and in which the height of the toe end 40 is smaller than the height of the heel end 38.

N4: The number of block pairs which are present in the crown zone Zc and which are not linked block pairs.

In other words, in the crown zone Zc, the ratio of the number N1 of the linked block pairs in which the height of the toe end 40 is greater than the height of the heel end 38 to the number N of all the block pairs (ratio N1/N) is 0.10 or more. The tire 2 with a ratio N1/N of 0.10 or more is excellent in grip performance during deceleration (or under low load conditions). In view of this, the ratio N1/N is more preferably 0.25 or more and particularly preferably 0.50 or more. The ratio N1/N may be 1.00.

A land ratio in the block pattern is preferably 13% or more and 60% or less. In the tire 2 with a land ratio of 13% or more, the ground contact pressure can be uniformly distributed. In this tire 2, damage to the blocks 28 can be reduced. In view of this, the land ratio is more preferably 14% or more and particularly preferably 15% or more. When the tire 2 with a land ratio of 60% or less rolls on a soft ground surface, the blocks 28 sufficiently stick in the ground surface. In view of this, the land ratio is more preferably 50% or less and particularly preferably 40% or less.

The land ratio is the ratio of the total area of all the lands 32 to the area of an imaginary tread surface. The "imaginary tread surface" refers to a tread surface that the tread 4 would have if the tread 4 was devoid of the sea 26, the tie bars 30, the side surfaces 34, and the side surfaces 37 and consisted entirely of the lands 32.

The hardness of the linked block pair is 45 or more and 88 or less. The linked block pair with the hardness in this range can contribute to grip performance on hard ground surfaces. In view of this, the hardness is more preferably 55 or more and particularly preferably 60 or more. The hardness is more preferably 80 or less and particularly preferably 75 or less. The hardness is measured by pressing a JIS-A hardness scale against the linked block pair. The measurement is performed at a temperature of 25° C.

In the present invention, the dimensions and angles of the components of the tire 2 are measured in a state where the tire 2 is mounted on a normal rim and inflated with air to a normal internal pressure. During the measurement, no load is applied to the tire 2. The term "normal rim" as used herein means a rim specified in a standard on which the tire 2 is based. The "standard rim" in the JATMA standard, the "Design Rim" in the TRA standard, and the "Measuring Rim" in the ETRTO standard are normal rims. The term "normal internal pressure" as used herein means an internal pressure specified in a standard on which the tire 2 is based. The "highest air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are normal internal pressures.

EXAMPLES

Experiment 1: Front Tires

Example 1

A front tire having the structure as shown in FIGS. 1 to 6 was obtained. The size of the tire was "80/100-21". The crown zone of the tire includes a large number of block pairs. In the crown zone, the ratio of the number N1 of the linked block pairs in which the height of the toe end is greater than the height of the heel end to the number N of all the block pairs (ratio N1/N) is 0.75. In each linked block pair, the height H1 of the heel end is 2.0 mm, and the height H2 of the toe end is 8.0 mm.

Examples 2 to 7 and Comparative Examples 1 and 2

Tires of Examples 2 to 7 and Comparative Examples 1 and 2 were obtained in the same manner as the tire of Example 1, except the height H1 and the height H2 were as shown in Tables 1 and 2 below.

Examples 8 to 10

The tires of Examples 8 to 10 were obtained in the same manner as the tire of Example 1, except the ratio N1/N was as shown in Table 3 below.

[Sensory Evaluation]

Each tire was inflated with air to an internal pressure of 80 kPa. The tire was mounted on the front rim (WM 1.60) of a commercially-available motorcycle for running on rough terrain (engine: four-stroke engine, displacement: 450 cc). A commercially-available tire was mounted on the rear rim of the motorcycle. The motorcycle was allowed to run on a motocross course having a hard ground surface and a soft ground surface, and evaluation by the rider was made as to grip performance during deceleration and low resistance during acceleration. The results are shown as evaluation scores in Tables 1 to 3 below. A higher score indicates a better performance.

[Overall Evaluation]

The tires were rated according to the following criteria.

A: The score for grip performance during deceleration is 110 or higher, and the score for low resistance during acceleration is higher than for Comparative Example 1.

B: The score for grip performance during deceleration is 101 or higher and less than 110, and the score for low resistance during acceleration is higher than for Comparative Example 1.

C: The score for grip performance during deceleration is 100 or lower.

The results are shown in Tables 1 to 3 below.

TABLE 1

Evaluation Results of Front Tires

|  | Example 2 | Example 1 | Example 3 | Example 4 |
|---|---|---|---|---|
| Heel end H1 (mm) | 1.0 | 2.0 | 3.5 | 4.5 |
| Toe end H2 (mm) | 9.0 | 8.0 | 6.5 | 5.5 |
| θ (deg.) | 43 | 35 | 19 | 7 |
| H2/Hb | 0.69 | 0.62 | 0.50 | 0.42 |
| N1/N | 0.75 | 0.75 | 0.75 | 0.75 |
| Hardness (JIS A) | 70 | 70 | 70 | 70 |
| Land ratio (%) | 15 | 15 | 15 | 15 |
| Grip performance during deceleration | 116 | 120 | 114 | 111 |
| Low resistance during acceleration | 108 | 110 | 110 | 106 |
| Overall evaluation | A | A | A | A |

TABLE 2

Evaluation Results of Front Tires

|  | Example 5 | Example 6 | Example 7 | Comp. Example 1 | Comp. Example 2 |
|---|---|---|---|---|---|
| Heel end H1 (mm) | 5.0 | 5.0 | 1.0 | 5.0 | 8.0 |
| Toe end H2 (mm) | 5.5 | 13.0 | 2.5 | 5.0 | 4.0 |
| θ (deg.) | 3 | 45 | 9 | 0 | −25 |
| H2/Hb | 0.42 | 1.00 | 0.19 | 0.38 | 0.31 |
| N1/N | 0.75 | 0.75 | 0.75 | 0.00 | 0.00 |
| Hardness (JIS A) | 70 | 70 | 70 | 70 | 70 |
| Land ratio (%) | 15 | 15 | 15 | 15 | 15 |
| Grip performance during deceleration | 107 | 102 | 104 | 100 | 80 |
| Low resistance during acceleration | 100 | 110 | 102 | 100 | 90 |
| Overall evaluation | B | B | B | C | C |

TABLE 3

Evaluation Results of Front Tires

|  | Example 8 | Example 9 | Example 10 |
|---|---|---|---|
| Heel end H1 (mm) | 2.0 | 2.0 | 2.0 |
| Toe end H2 (mm) | 8.0 | 8.0 | 8.0 |
| θ (deg.) | 35 | 35 | 35 |
| H2/Hb | 0.62 | 0.62 | 0.62 |
| N1/N | 1.00 | 0.50 | 0.25 |
| Hardness (JIS A) | 70 | 70 | 70 |
| Land ratio (%) | 15 | 15 | 15 |
| Grip performance during deceleration | 120 | 116 | 107 |
| Low resistance during acceleration | 110 | 108 | 102 |
| Overall evaluation | A | A | B |

As shown in Tables 1 to 3, the tires of Examples are rated A or B in the overall evaluation. The evaluation results clearly demonstrate the advantages of the present invention.

Experiment 2 Rear Tires

Example 1

A rear tire having a block pattern identical to the pattern as shown in FIG. 1 was obtained. The size of the tire was "120/90-19". The crown zone of the tire includes a large number of block pairs. In the crown zone, the ratio of the number N1 of the linked block pairs in which the height of the toe end is greater than the height of the heel end to the number N of all the block pairs (ratio N1/N) is 0.75. In each linked block pair, the height H1 of the heel end is 3.0 mm, and the height H2 of the toe end is 9.0 mm.

Examples 2 to 7 and Comparative Examples 1 and 2

The tires of Examples 2 to 7 and Comparative Examples 1 and 2 were obtained in the same manner as the tire of Example 1, except the height H1 and the height H2 were as shown in Tables 4 and 5 below.

Examples 8 to 10

The tires of Examples 8 to 10 were obtained in the same manner as the tire of Example 1, except the ratio N1/N was as shown in Table 6 below.

[Sensory Evaluation]

Each tire was inflated with air to an internal pressure of 80 kPa. The tire was mounted on the rear rim (WM 2.15) of a commercially-available motorcycle for running on rough terrain (engine: four-stroke engine, displacement: 450 cc). A commercially-available tire was mounted on the front rim of the motorcycle. The motorcycle was allowed to run on a motocross course having a hard ground surface and a soft ground surface, and evaluation by the rider was made as to grip performance during deceleration and traction during acceleration and steady-speed running. The results are shown as evaluation scores in Tables 4 to 6 below. A higher score indicates a better performance.

[Overall Evaluation]

The tires were rated according to the following criteria.

A: The score for grip performance during deceleration is 110 or higher, and the score for traction during acceleration and steady-speed running is 95 or higher.

B: The score for grip performance during deceleration is 101 or higher and lower than 110, and the score for traction during acceleration and steady-speed running is 95 or higher.

C: The score for grip performance during deceleration is 100 or lower.

The results are shown in Tables 4 to 6 below.

TABLE 4

Evaluation Results of Rear Tires

|  | Example 2 | Example 1 | Example 3 | Example 4 |
|---|---|---|---|---|
| Heel end H1 (mm) | 1.0 | 3.0 | 4.5 | 5.5 |
| Toe end H2 (mm) | 11.0 | 9.0 | 7.5 | 6.5 |
| θ (deg.) | 28 | 18 | 9 | 3 |
| H2/Hb | 0.69 | 0.56 | 0.47 | 0.41 |
| N1/N | 0.75 | 0.75 | 0.75 | 0.75 |
| Hardness (JIS A) | 70 | 70 | 70 | 70 |
| Land ratio (%) | 22 | 22 | 22 | 22 |
| Grip performance during deceleration | 116 | 120 | 116 | 112 |
| Traction | 100 | 100 | 100 | 100 |
| Overall evaluation | A | A | A | A |

TABLE 5

Evaluation Results of Rear Tires

|  | Example 5 | Example 6 | Example 7 | Comp. Example 1 | Comp. Example 2 |
|---|---|---|---|---|---|
| Heel end H1 (mm) | 6.0 | 6.0 | 1.0 | 6.0 | 9.0 |
| Toe end H2 (mm) | 7.0 | 16.0 | 2.5 | 6.0 | 5.0 |
| θ (deg.) | 3 | 31 | 4 | 0 | −12 |
| H2/Hb | 0.44 | 1.00 | 0.16 | 0.38 | 0.31 |
| N1/N | 0.75 | 0.75 | 0.75 | 0.00 | 0.00 |
| Hardness (JIS A) | 70 | 70 | 70 | 70 | 70 |
| Land ratio (%) | 22 | 22 | 22 | 22 | 22 |
| Grip performance during deceleration | 110 | 103 | 101 | 100 | 80 |
| Traction | 100 | 100 | 95 | 100 | 102 |
| Overall evaluation | A | B | B | C | C |

TABLE 6

Evaluation Results of Rear Tires

|  | Example 8 | Example 9 | Example 10 |
|---|---|---|---|
| Heel end H1 (mm) | 3.0 | 3.0 | 3.0 |
| Toe end H2 (mm) | 9.0 | 9.0 | 9.0 |
| θ (deg.) | 18 | 18 | 18 |
| H2/Hb | 0.56 | 0.56 | 0.56 |
| N1/N | 1.00 | 0.50 | 0.25 |
| Hardness (JIS A) | 70 | 70 | 70 |
| Land ratio (%) | 22 | 22 | 22 |
| Grip performance during deceleration | 120 | 117 | 109 |
| Traction | 100 | 100 | 100 |
| Overall evaluation | A | A | B |

As shown in Tables 4 to 6, the tires of Examples are rated A or B in the overall evaluation. The evaluation results clearly demonstrate the advantages of the present invention.

The tire according to the present invention can be mounted on a motorcycle which runs on various kinds of ground surfaces. The foregoing description is given for illustrative purposes, and various modifications can be made without departing from the principles of the present invention.

What is claimed is:

1. A motorcycle tire for running on rough terrain, comprising a tread having a block pattern, wherein
the block pattern includes: a sea; a plurality of blocks, each block rising from the sea and having a land; and a plurality of tie bars, each tie bar rising from the sea,
a plurality of block pairs are formed in the block pattern, each block pair including two adjacent ones of the plurality of blocks, where the two adjacent ones are arranged side by side in a tire axial direction,
the block pairs include a plurality of linked block pairs, each linked block pair includes two of the plurality of blocks and one of the plurality of tie bars, the tie bar of the linked block pair being interposed between the two blocks and linking the two blocks together, and
the tie bar of the linked block pair has a toe end edge having a height equal to or smaller than a height of the blocks and a heel end edge having a height smaller than the height of the toe end edge.

2. The tire according to claim 1, wherein one of the tie bars has a height that continuously increases from the heel end edge toward the toe end edge.

3. The tire according to claim 1, wherein a line connecting the heel end edge and the toe end edge forms an angle of 2° or more with a circumferential direction of the tire.

4. The tire according to claim 1, wherein a ratio H2/Hb in one of the linked block pairs is 0.20 or more and 0.95 or less, wherein H2 represents the height of the toe end edge and Hb represents the height of the blocks.

5. The tire according to claim 1, wherein
the tread includes: a crown zone located in a center of the tread in the axial direction of the tire; a pair of middle zones, each middle zone being located outward of the crown zone in the axial direction; and a pair of shoulder zones, each shoulder zone being located outward of the middle zones in the axial direction, and
a ratio N1/N in the crown zone is 0.10 or more, wherein N1 represents the number of the linked block pairs in which the height of the toe end edge is greater than the height of the heel end edge and N represents the number of all the block pairs.

6. The tire according to claim 1, wherein a land ratio in the block pattern is 13% or more and 60% or less.

7. The tire according to claim 1, wherein a JIS-A hardness of one of the linked block pairs is 45 or more and 88 or less.

8. The tire according to claim 1, wherein the tire is mounted on a front rim of a motorcycle.

9. A motorcycle tire for running on rough terrain, comprising a tread having a block pattern, wherein
the block pattern includes: a sea; a plurality of blocks, each block rising from the sea and having a land; and a plurality of tie bars, each tie bar rising from the sea,
a plurality of block pairs are formed in the block pattern, each block pair including two adjacent ones of the plurality of blocks, where the two adjacent ones are arranged side by side in a tire axial direction,
the block pairs include a plurality of linked block pairs, each linked block pair includes two of the plurality of blocks and one of the plurality of tie bars, the tie bar of the linked block pair being interposed between the two blocks and linking the two blocks together, and
the tie bar of the linked block pair has a toe end having a height equal to or smaller than a height of the blocks and a heel end having a height smaller than the height of the toe end,
wherein one of the tie bars has a height that continuously increases all the way from the heel end toward the toe end.

* * * * *